June 4, 1963
L. F. BURKE
3,092,394
AUTOMOBILE MECHANIC'S CREEPER WITH
ADJUSTABLE HEADREST
Filed May 23, 1962
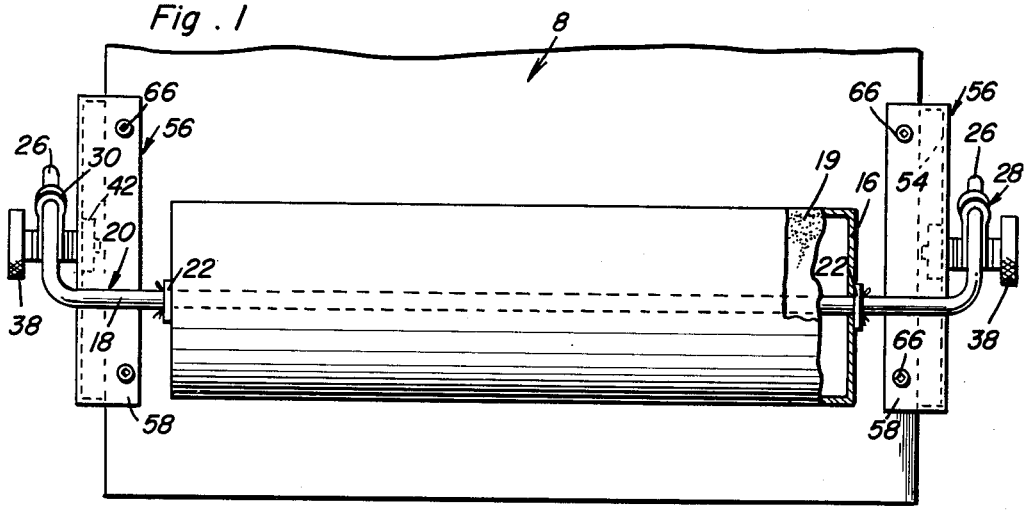
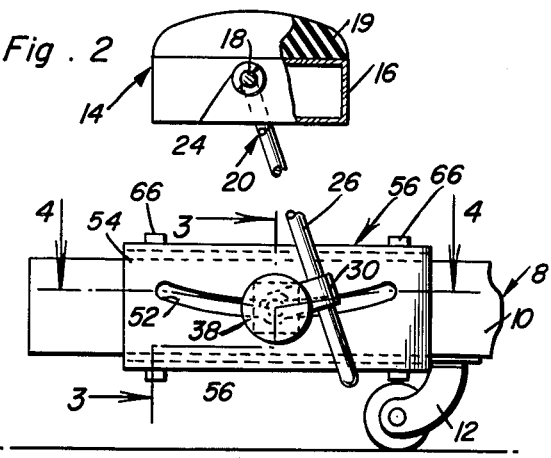
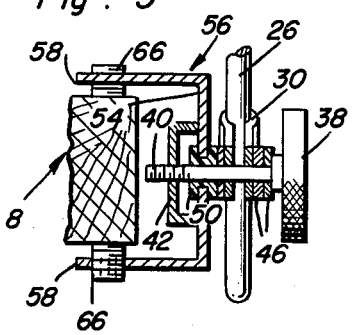
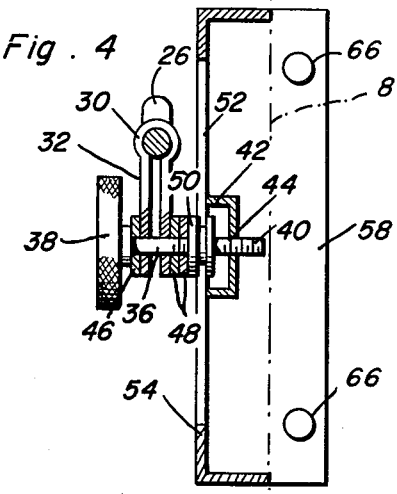
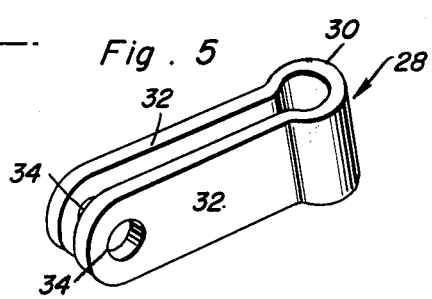
Lawrence F. Burke
*INVENTOR.*

United States Patent Office 3,092,394
Patented June 4, 1963

3,092,394
AUTOMOBILE MECHANIC'S CREEPER WITH ADJUSTABLE HEADREST
Lawrence F. Burke, P.O. Box 231, Longview, Tex.
Filed May 23, 1962, Ser. No. 197,045
5 Claims. (Cl. 280—32.6)

The present invention relates to an improved headrest, generally speaking, and novel means whereby the same may be detachably and adjustably mounted on a dolly or creeper of a type which is customarily and commonly used by an automobile mechanic when he is called upon to attend to repair work therebeneath.

The commonly used creeper comprises a simple panel or base providing a platform and equipped at corner portions with appropriate casters. Ordinarily a transverse suitably padded or cushioned headrest is fixed across one end of the top side of the platform. Persons conversant with this line of endeavor have long recognized the need for a movably mounted headrest, one which is capable of being appropriately adjusted to better accommodate the head and neck of the mechanic, particularly when the job at hand is one which requires the mechanic to hold his head in an up position by way of the muscles in his neck. The fact that the foregoing is an objectionable and tiresome practice has suggested the adoption and use of adjustable headrests. The fact is a number of patents have been granted looking toward a satisfactory solution of the problem. The additional fact that these prior art adaptations have apparently not met with widespread adoption and use gave rise to the instant effort to advance the art and, in doing so, to provide a novel headrest and attaching and mounting means therefor which, it is submitted, will effectively serve the purposes for which it is intended, will appeal to and be endorsed by manufacturers and retailers and, what is significantly important, will effectually serve the needs and requirements of automobile mechanics who use it.

In carrying out the principles of the present invention a simple U-shaped yoke or frame is employed, the lateral limbs or arms thereof being mounted in an improved manner on the longitudinal edge portions of the creeper's platform. With this arrangement the elongated central or bight portion of the frame spans the top surface of the platform in an elevated plane. The headrest is swingably suspended thereon in such a manner that it can be easily tilted to assume a desirable head and neck supporting angle.

The frame is of a dimension that the lateral attaching limbs or arms are such that they accommodate friction-gripping clamps, said clamps being mounted on anchoring and attaching devices and said devices, in turn, being adjustably mounted on slotted web portions of channel-shaped adapter brackets. These brackets in turn are such that the flanges thereof may be mounted on the top and bottom surfaces of the platform and held in position by setscrews.

More specifically simple channel-shaped adapter brackets are utilized and the web portion of each bracket is provided with a longitudinally extending arcuate slot. These slots serve to accommodate adjusting rollers which are carried by bolts, the bolts being clamped on the slotted webs and carrying the aforementioned limb clamps or clips.

By employing a U-frame with a padded headrest cradled on its bight portion and by attaching the limbs to clamps and mounting the clamps adjustably on the adapter brackets a construction is provided which is sufficiently versatile that, considered in an overal structural and functioning sense, effectively accomplishes the results desired.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a top plan view showing a fragmentary portion of the platform of a dolly or creeper and showing, what is more important, the headrest and mounting means therefor, portions being broken away and appearing in section;

FIGURE 2 is a fragmentary end view of the cushioned or padded headrest with portions broken away and appearing in section;

FIGURE 3 is an exaggerated view in section and elevation taken on the irregular section line 3—3 of FIGURE 2 looking in the direction of the arrows;

FIGURE 4 is a section on the horizontal section line 4—4 of FIGURE 2; and

FIGURE 5 is a view in perspective of an enlarged scale of one of the aforementioned limb clips or clamps.

By way of introduction to the description of the details it is to be pointed out that the instant concept comprehends the combination of a mobile platform (constituting a creeper or a dolly) and headrest means in combination therewith and, in addition, has to do with that aspect of the concept which pertains to the headrest means in the sense that it is an attachment which is susceptible of being applied to so-called conventional types of creepers which are commonly in use.

The dolly or creeper is denoted generally by the numeral 8, the platform is designated at 10 and the caster (only one shown) is denoted at 12. Broadly the headrest is denoted by the numeral 14. More specifically it comprises a hollow box-like base 16 which is of lightweight but strong material and which has a flat rectangular top to accommodate the attached pad or cushion 19. The cushion may be, if desired, enclosed in a leather or an equivalent jacket (not detailed). In any event the cushioned headrest is of a length to extend crosswise of the top surface of the platform and is of a transverse cross-section to comfortably support the neck of the user when the head is propped thereon in a generally well known manner. The median lengthwise portion of the part 16 of the headrest is pivotally or swingably suspended on the bight portion 18 of the inverted U-shaped frame 20. More particularly the bight portion is provided at longitudinally spaced points with cushion positioning and retaining washers 22 held in place by cotter keys in the manner shown. The depending arms or limbs 26 are provided with clamps or clips of the type shown at 28 in FIG. 5. Each clip comprises a strap of metal bent upon itself between its ends to provide an open-ended socket member 30 which receives the limb, and a pair of arms 32 having terminal holes 34 therein. The holes in each instance serve to accommodate the smooth portion of the shank 36 of a headed screw-threaded fastener or bolt. This bolt is provided at its outer end with a knurled fingergripping head or knob 38, the other end of the shank being screw-threaded at 40 to accommodate a hollow nut 42 the screw-threaded opening of which is denoted at 44. The bolts passes through the bolt holes 34 and spacing washers 46 and 48 are provided on opposite sides of the arms. This same bolt serves to accommodate a nylon roller 50 which is adapted to ride back and forth in an elongated arcuate slot 52 which is provided in the web 54 of a channel-shaped adapter bracket 56. As brought out in FIG. 4 the assembling and retaining nut 42 is applied to the interior surface of the web and the washers and clamp 28 are on the exterior side. The tightening of the bolt and nut serves to permit adjustment of the cooperating limb 26 whereby the frame 20 as an entity may be raised and lowered to consequently raise and lower the tiltable headrest 14. In addition the same bolt and nut means coacting with the slotted bracket permits the bolt and nut means including the clamp 28 to be shifted relative to the bracket in order to position the frame and bracket and headrest in whatever position is decided upon and depending, as is usually so, on the intentions and desires of the user.

The spaced parallel top and bottom flanges 58 (see FIG. 3) are provided with screw-threaded holes to accommodate setscrews 66, said setscrews having tool sockets therein for use in a self-evident manner.

It will be evident that it is within the purview of the overall inventive concept to provide the self-angling or tiltable pivotally mounted headrest means 14 on a U-shaped or an equivalent arched frame and to detachably and adjustably mount the same on edge portions of the platform to provide a creeper with an adaptable headrest. Then, too, novelty is predicated on the aspect of the concept which may be construed purely as a ready-to-use attachment, that is, an attachment which in conjunction with suitable adapter brackets, paves the way for use of the attachment on creepers which are now on the market and in use.

It is believed that a careful consideration of the description in conjunction with the views of the drawing will enable the reader to obtain a clear and comprehensive understanding of the subject matter of the invention. Therefore, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for an automobile mechanic's creeper comprising, in combination, a pair of like adapter brackets each channel-shaped in cross-section and embodying a web provided with lateral lengthwise flanges, said flanges being adapted to straddle top and bottom surfaces of the creeper's platform and having setscrews for retaining the same in place, said web being provided with a longitudinal formed slot, a bolt and nut assembly, said nut being arranged against an interior side of the web, the shank extending through the slot and the head of the bolt being disposed on an exterior side of the web, clamps mounted on the respective bolts, each clamp having a socket member, a substantially U-shaped frame having a bight portion and lateral limbs, said limbs extending into and through the cooperating socket members, and a headrest swingably mounted on said bight portion.

2. For use on the platform of an automobile mechanic's creeper: readily applicable and removable headrest means comprising an inverted U-shaped frame embodying a bight portion of a length to extend transversely across the top of the above-mentioned platform and depending arms adapted to straddle lengthwise edge portions of said platform, a pair of like adapter brackets connectible to said edge portions in positions directly opposed to each other, said brackets provided with means whereby they can be operatively but detachably mounted on said edge portions, means adjustably joining said arms to their respectively associated brackets, and a head rest operatively suspended on said bight portion, each bracket being channel-shaped in cross-section, said bracket having a web portion and lateral longitudinal flanges, said flanges adapted to clampingly embrace top and bottom surfaces of the platform and having setscrews which are positioned on the flanges to engage said surfaces in a manner to securely clamp said bracket in a given usable position.

3. The structure according to claim 2, and wherein said adjustable joining means is adjustably and removably mounted on the web with which it is cooperable.

4. In combination, an automobile mechanic's creeper embodying a mobile platform, an inverted U-shaped frame embodying a bight portion extending horizontally across and parallel to an underlying top surface of said platform and provided at end portions thereof with duplicate depending coplanar limbs designed and adapted to straddle the lengthwise edge portions of said platform, a headrest pivotally mounted on said bight portion, said headrest being self-leveling when being used, a pair of attaching clamps, each attaching clamp embodying a socket member, the adjacent cooperating end of the coacting limb being fitted slidingly and detachably in the socket member provided therefor, each clamp being provided with arms, a bolt and nut assembly including a bolt detachably and adjustably mounted in bolt holes provided therefor in the cooperating arms, a marginally grooved roller mounted on a median portion of the shank of the bolt, opposed portions of the lengthwise edge portions of said platform being provided with means for mounting said rollers and consequently bolts on said platform, said means each provided with a lengthwise roller slot and said rollers being slidingly keyed in their respective slots.

5. In combination, an automobile mechanic's creeper embodying a portable platform, a headrest disposed in a usable position above and over said platform and provided at end portions thereof with depending supporting and adjusting limbs, said limbs straddling opposite corresponding portions of the lengthwise edge portions of said platform, each edge portion having elongated slot means disposed in a substantially horizontal plane when in use, a marginally grooved anti-friction and adjusting roller mounted in each slot and shiftable lengthwise therein for adjustment purposes, a bolt and nut assembly, said bolt having a shank portion mounted in the bearing provided therefor on said roller, a clamp disposed at right angles to the lengthwise dimension of said shank and having arms provided with bolt holes through which said shank is extended and further having a socket member, an adjacent lower end portion of the cooperating limb being slidingly and detachably mounted in said socket member.

References Cited in the file of this patent

UNITED STATES PATENTS

| 1,031,020 | Murphy | July 2, 1912 |
| 2,463,410 | Morris | Mar. 1, 1949 |
| 2,564,323 | Brown | Aug. 14, 1951 |
| 2,595,783 | Griffin | May 6, 1952 |
| 2,652,101 | Samsky et al. | Sept. 15, 1953 |

FOREIGN PATENTS

| 257,379 | Great Britain | Sept. 2, 1926 |